United States Patent
Cohades et al.

(10) Patent No.: US 12,370,756 B2
(45) Date of Patent: Jul. 29, 2025

(54) COMPOSITE MATERIAL

(71) Applicant: ECOLE POLYTECHNIQUE FEDERALE DE LAUSANNE (EPFL), Lausanne (CH)

(72) Inventors: Amaël Cohades, Nyon (CH); Véronique Michaud, Saint Saphorin sur Morges (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 921 days.

(21) Appl. No.: 17/274,320

(22) PCT Filed: Sep. 6, 2019

(86) PCT No.: PCT/IB2019/057526
§ 371 (c)(1),
(2) Date: Mar. 8, 2021

(87) PCT Pub. No.: WO2020/049516
PCT Pub. Date: Mar. 12, 2020

(65) Prior Publication Data
US 2021/0323246 A1    Oct. 21, 2021

(30) Foreign Application Priority Data
Sep. 6, 2018   (DE) .......................... 102018121811.7

(51) Int. Cl.
*B29K 63/00* (2006.01)
*B29B 15/12* (2006.01)
(Continued)

(52) U.S. Cl.
CPC ............ *B29C 70/345* (2013.01); *B29B 15/12* (2013.01); *B29C 73/00* (2013.01); *C08J 5/24* (2013.01);
(Continued)

(58) Field of Classification Search
CPC ....... B29C 70/345; B29C 73/00; B29C 73/16; B29C 73/22; B29B 15/12; C08J 5/24;
(Continued)

(56) References Cited

U.S. PATENT DOCUMENTS 4,842,924 A * 6/1989 Farris .................... B29B 15/122
428/221
5,102,601 A * 4/1992 Farris ..................... B29C 70/10
264/108
(Continued)

FOREIGN PATENT DOCUMENTS

CN    101432359 A    5/2009
JP    H0457933 A    2/1992
(Continued)

OTHER PUBLICATIONS

Translation for Hoyano et al (JP H0542536 A) (Year: 1993).*
(Continued)

*Primary Examiner* — Nathan L Van Sell
(74) *Attorney, Agent, or Firm* — REISING ETHINGTON, P.C.

(57) ABSTRACT

A composite material includes a fibrous reinforcement and a polymer matrix. The polymer matrix includes two interpenetrating phases, namely a thermoset phase and a continuous thermoplastic phase. The thermoset phase and the thermoplastic phase form a matrix microstructure. The matrix microstructure includes a thermoplastic matrix formed by the thermoplastic phase. The matrix microstructure includes a multitude of thermoset particles formed by the thermoset phase. The thermoset particles have dimensions in a range between 0.1 µm and 10 µm.

10 Claims, 5 Drawing Sheets

(51) Int. Cl.
  *B29C 70/34* (2006.01)
  *B29C 73/00* (2006.01)
  *B29K 309/08* (2006.01)
  *B29L 31/08* (2006.01)
  *C08J 5/24* (2006.01)

(52) U.S. Cl.
  CPC ........... *C08J 5/246* (2021.05); *B29K 2063/00* (2013.01); *B29K 2309/08* (2013.01); *B29L 2031/085* (2013.01); *C08J 2363/00* (2013.01)

(58) Field of Classification Search
  CPC ........ C08J 5/246; C08J 2363/00; C08J 5/043; C08J 2367/04; C08J 2463/00; B29K 2063/00; B29K 2309/08; B29L 2031/085
  See application file for complete search history.

(56) References Cited

U.S. PATENT DOCUMENTS

| | | | |
|---|---|---|---|
| 5,227,236 | A | 7/1993 | Handermann |
| 5,487,941 | A | 1/1996 | Pepin |
| 8,137,786 | B2 | 3/2012 | Kousaka et al. |
| 9,212,295 | B2 | 12/2015 | Ushiyama et al. |
| 2009/0208721 | A1* | 8/2009 | Tsuchiya ........... B29C 45/14786 264/250 |
| 2009/0258965 | A1* | 10/2009 | Lassila ..................... A61K 6/54 523/116 |
| 2011/0003159 | A1 | 1/2011 | Mather et al. |
| 2011/0143619 | A1 | 6/2011 | Luinge et al. |
| 2019/0040290 | A1* | 2/2019 | Okamoto ................ B32B 27/06 |

FOREIGN PATENT DOCUMENTS

| | | | |
|---|---|---|---|
| JP | 2005239939 | A | 9/2005 |
| JP | 2007314753 | A | 12/2007 |
| JP | 2008156486 | A | 7/2008 |
| JP | 2012219115 | A | 11/2012 |
| JP | 2016074922 | A | 5/2016 |
| WO | WO2013122847 | A1 | 8/2013 |

OTHER PUBLICATIONS

Japanese Office Action for Japanese Application No. JP2021-510179 dated Jan. 23, 2023 (5 pages).
English Translation of Japanese Office Action for Japanese Application No. JP2021-510179 dated Jan. 23, 2023 (6 pages).
Anonymous, "A process for manufacturing a prepreg and composites manufactured therefrom", Research Disclosure, Kenneth Mason Publications, Aug. 1, 1988, vol. 292, No. 15, ISSN: 0374-4353, Hampshire, UK, GB.
Meijer H E H et al., "Processing of thermoplastic polymers using reactive solvents", High performance polymers, Institute of Physics Publishing, Jan. 1, 1996, pp. 133-167, vol. 8, No. 1, ISSN: 0954-0083, Bristol, GB.
Poel et al., "Reaction induced phase separation in semicrystalline thermoplastic/expoxy resin blends", Polymer, Elsevier Science Publishers B.V., Nov. 21, 2005, pp. 10758-10771, vol. 46, No. 24, ISSN: 0032-3861, GB.
Xiaofan Luo et al. "A Thermoplastic/Thermoset Blend Exhibiting Thermal Mending and Reversible Adhesion", ACS Applied Materials & Interfaces, Mar. 25, 2009, pp. 612-620, vol. 1, No. 3, ISSN: 1944-8244.
Cohades Amaël et al., "Thermal mending in immiscible poly([epsilon]-caprolactone) / epoxy blends" European Polymer Journal, Pergamon Press LTD., May 30, 2016, pp. 114-128, vol. 81, ISSN: 0014-3057, Oxford, GB.
Amaël Cohades et al., "Thermal mending in E-glass reinforced poly([epsilon]-caprolactone/epoxy blends", Composites Part A: Applied Science and Manufacturing, Aug. 1, 2017, pp. 129-138, vol. 99, ISSN: 1359-835X, Amsterdam, NL.
International Search Report for International Application No. PCT/IB2019/057526 dated Feb. 10, 2020 (5 pages).
Written Opinion for International Application No. PCT/IB2019/057526 dated Feb. 10, 2020 (8 pages).
Japanese Office Action for Japanese Application No. JP2021-510179 dated May 18, 2022 (3 pages).
English Translation of Japanese Office Action for Japanese Application No. JP2021-510179 dated May 18, 2022 (4 pages).

* cited by examiner

COMPOSITE MATERIAL

TECHNICAL FIELD

The disclosure relates to a composite material. The disclosure furthermore relates to methods for producing a composite material, an industrial device as well as a method for healing a defect in a composite material.

BACKGROUND

Composite materials are well-known in the art. In particular, so-called self-healable or healable composite materials are known, which can for example be healed at least partly autonomously or by the application of heat after microcracks or other defects have occurred in the material.

One problem with the known healable composite materials is the fact that there is always a trade-off between healing and maintenance of the initial properties of the composite material, such as strength and toughness. It is not at all unusual that if high levels of healing are obtained (for example healing efficiencies of up to 95%), that at the same time the toughness and/or strength of the composite material significantly diminishes, for example by 30% or lower.

SUMMARY

It is an object of the disclosure, per an embodiment, to solve or to at least diminish the above-mentioned disadvantages. In particular, it is an object of the disclosure, per an embodiment, to define a composite material in which can heal microcracks, has mechanical properties close to those of conventional systems and which even after healing maintains its initial properties in an acceptable manner. Another object of the disclosure, per an embodiment, is for such a composite material to be producible as easily as possible in large scale industrial processes.

This problem is solved according to an embodiment by a composite material, comprising a fibrous reinforcement and a polymer matrix, wherein the polymer matrix comprises two interpenetrating phases, namely a thermoset phase and a continuous thermoplastic phase, wherein the thermoset phase and the thermoplastic phase form a matrix microstructure, wherein the matrix microstructure comprises a thermoplastic matrix formed by the thermoplastic phase, wherein the matrix microstructure comprises a multitude of thermoset particles formed by the thermoset phase, wherein the thermoset particles have dimensions in a range between 0.1 μm and 10 μm. In at least some embodiments, the thermoset particles have dimensions in a range between 1 μm and 10 μm.

The inventors have surprisingly found that thermoset particles in such ranges lead to composite materials with a matrix microstructure in which defects such as microcracks can be healed by application of moderate heat, while the initial properties, such as strength and toughness of the composite material, are well maintained after the healing process. The inventors have furthermore found that such a composite material, per an embodiment, can be advantageously produced in different alternative ways.

In at least some embodiments, the thermoset particles are at least partly interconnected. "At least partly interconnected" is to be understood such that it is for example possible, that some of the thermoset particles are interconnected and some are not and/or that the thermoset particles form clusters in which the respective thermoset particles are interconnected but wherein not all clusters are necessarily interconnected. In an embodiment, the thermoset particles are interconnected.

In at least some embodiments, the composite material is a solid material.

In at least some embodiments, the fibrous reinforcement has a fibre volume fraction between 20% and 75%, preferably between 30% and 65%, more preferably between 38% and 55%. The inventors have found that volume fractions in these ranges for the fibrous reinforcement may be particularly advantageous because they lead to a good trade-off between healing capacities and maintenance of initial properties. However, it is also possible for the fibrous reinforcement to have a different volume fraction, for example below 20%.

In a at least some embodiments, the thermoset phase comprises epoxy resin and/or the thermoplastic phase has a melting point below 200° C., preferably below 190° C., more preferably below 180° C. and/or in that the thermoplastic phase has a viscosity low enough to flow under the pressure created by its own thermal expansion through a moderate heat treatment. The inventors have found that such capacities of the thermoset phase and/or the thermoplastic phase, per an embodiment, may be particularly advantageous and lead to good healing capacities while maintaining particularly well the initial properties of the composite material before treatment. However, it would also be possible to use another material as the thermoset phase instead of the epoxy resin, and/or to use thermoplastic phases with different melting points.

In at least some embodiments, the matrix microstructure comprises an interpenetrated network of interconnected thermoset particles with a surrounding thermoplastic matrix. Such a matrix microstructure is typically produced by a process of polymerization induced phase separation, which is taking place during cure of the thermoset. Such an arrangement of the matrix microstructure may have the advantage to be particularly adapted for good healing capacities and good maintenance of the initial parameters of the composite material. In addition to that, such a matrix microstructure can be produced with large scale industrial processes.

In at least some embodiments, phase dimensions of the thermoplastic phase are in the range between 0.1 μm and 10 μm, preferably between 1 μm and 10 μm, at least in one direction, for example a thickness. In other words: It is possible that the thermoplastic phase is formed by a material, in particular a rigid material, which has a thickness in the range between 0.1 μm and 10 μm, preferably between 1 μm and 10 μm, in one direction while it has a much larger dimension in any other direction.

In at least some embodiments, a volumetric ratio of thermoset to thermoplastic is between 60/40 and 95/5, preferably between 70/30 and 90/10. The inventors have found that such volumetric ratios lead to appropriate viscosities and flow velocities during heating of the composite material, while degradations of the initial properties of the composite material are avoided.

In at least some embodiments, the composite material has a thickness between 0.5 mm and 30 mm, preferably between 0.8 mm and 25 mm, more preferably between 1 mm and 20 mm. Such dimensions of the composite material may be advantageous because they can be easily produced and because there are occasions, for which such dimensions are adequate. However, it is in theory also possible for the composite material to have smaller thicknesses, for example in the range of 0.2 mm, or larger thicknesses, for example in the range of 40-50 mm or even up to the range of centimetres.

In a method for producing a composite material according to an embodiment of the disclosure, a thermoplastic starting material in the form of thermoplastic pellets and/or thermoplastic thin films and/or thermoplastic spun fibres is used for producing the composite material.

In at least one embodiment, the method for producing a composite material according to the disclosure comprises the steps:
  blending a liquid thermoset and a multitude of thermoplastic pellets such as to create a liquid thermoset-thermoplastic blend,
  applying the liquid thermoset-thermoplastic blend on the fibrous reinforcement to create a prepreg material,
  curing the prepreg material in order to create the composite material comprising the matrix microstructure.

In this context, instead of saying that the produced composite material comprises the matrix microstructure, one could also say that the composite material comprises a polymer matrix which exhibits the matrix microstructure.

In at least one embodiment, the method for producing a composite material according to the disclosure comprises the steps:
  creation of a film-reinforcement stack from thermoplastic thin films and fibrous reinforcement layers by adding the thermoplastic thin films as interlayers in between each fibrous reinforcement layer,
  infusion of a liquid thermoset as pure thermoset matrix into the film-reinforcement-stack, thereby creating an infused stack,
  partial or complete dissolution of the thermoplastic thin films as thermoplastic phase in the thermoset matrix, and
  curing the infused stack in order to create the composite material comprising the matrix microstructure.

In at least some embodiments, the thermoplastic thin films are perforated and/or the thermoplastic thin films each have a thickness between 20 µm and 1000 µm, preferably between 20 µm and 100 µm, more preferably approximately 40 µm. In this context, the term "approximately is to be understood as "+/−20%". Using perforated thermoplastic thin films may have the advantage, per an embodiment, of making infusion of the liquid thermoset into the film-reinforcement-stack easier.

In at least one embodiment, the method for producing a composite material according to the disclosure comprises the steps:
  creation of a fibre-reinforcement-stack comprising thermoplastic spun fibres and a fibrous reinforcement, and
  infusion of a liquid thermoset as pure thermoset matrix into the fibre-reinforcement-stack, thereby creating an infused stack, and
  curing the infused stack in order to create the composite material comprising the matrix microstructure.

In at least some embodiments, the infusion of the liquid thermoset is carried out at ambient temperature, preferably at approximately 20° C., wherein "approximately" typically refers to an acceptable tolerance of +/−5° C., preferably +/−2° C. In at least some embodiments, curing is carried out at a curing temperature between 50° C. and 70° C., typically between 55° C. and 65° C., preferably at a curing temperature of approximately 60° C., wherein "approximately" typically refers to an acceptable tolerance of +/−5° C., preferably +/−2° C. In at least some embodiments, a first postcuring step is carried out at a curing temperature between 70° C. and 90° C., typically between 75° C. and 85° C., preferably at a postcuring temperature of approximately 80° C., wherein "approximately" typically refers to an acceptable tolerance of +/−5° C., preferably +/−2° C. The curing time, i.e. the duration of the curing step, is typically situated between 6 h and 24 h. The first postcuring time, i.e. the duration of the first postcuring step, is typically situated between 4 h and 15 h. In at least some embodiments, the first postcuring step is followed by a second postcuring step. The second postcuring step is typically carried out at a temperature which is higher than the temperature at which the first postcuring step is carried out. In at least some embodiments, the second postcuring step is carried out at a curing temperature between 90° C. and 110° C., typically between 95° C. and 105° C., preferably at a postcuring temperature of approximately 100° C., wherein "approximately" typically refers to an acceptable tolerance of +/−5° C., preferably +/−2° C. In at least some embodiments, the first postcuring step is three to five times longer, preferably approximately four times longer, than the second postcuring step. In at least some embodiments the first postcuring step is carried out at approximately 80° C. for approximately 4 h and the second postcuring step is carried out at approximately 100° C. for approximately 1 h. In general, "approximately" can for example refer to an acceptable tolerance of 20%, preferably 10%, more preferably 5% for the corresponding values.

In at least one embodiment, the thermoplastic spun fibres have diameters between 20 µm and 1000 µm, preferably between 20 µm and 100 µm, more preferably approximately 40 µm.

In at least one embodiment, the fibre-reinforcement-stack is made by depositing the thermoplastic spun fibres onto the fibrous reinforcement or by co-weaving the thermoplastic spun fibres with the fibrous reinforcement.

In at least some embodiments, the curing is carried out at a curing temperature that is adapted to a type of thermoset material that is used for producing the composite material. Therein, the curing temperature is preferably high enough to dissolve at least partially the thermoplastic phase.

An industrial device comprising a composite material according to an embodiment of the disclosure is preferably a structural material, such as a wind turbine component, in particular a wind turbine rotor blade. In at least some embodiments, the industrial device is a component of another type of machine, for example a machine in the energy sector or the industrial sector or the chemical sector. In at least some embodiments, the industrial device is part of a structural component. It is in theory also possible to use the composite material in an industrial device which is a sports equipment, such as a ski, a snowboard, a surfboard or a sailboat or a component thereof. In at least some embodiments, the composite material is used in a train, such as a high speed train, or in another means for locomotion, such as land vehicles or air vehicles.

In a method for healing a defect, in particular a microcrack, in a composite material according to an embodiment of the disclosure and/or in an industrial device according to an embodiment of the disclosure, that method comprises the steps:
  heating the composite material and/or the industrial device to a repair temperature, wherein the repair temperature is located between 80° C. and 180° C., preferably between 140° C. and 160° C., more preferably between 145° C. and 155° C., and
  maintaining the repair temperature essentially constant during a repair period, wherein the repair period has a length between 1 minute and 50 minutes, typically between 10 minutes and 50 minutes, preferably between 20 minutes and 40 minutes, more preferably between 25 minutes and 35 minutes.

BRIEF DESCRIPTION OF THE FIGURES

In the following, the disclosure is described in detail by means of drawings, wherein show.

DETAILED DESCRIPTION

Figure 1:
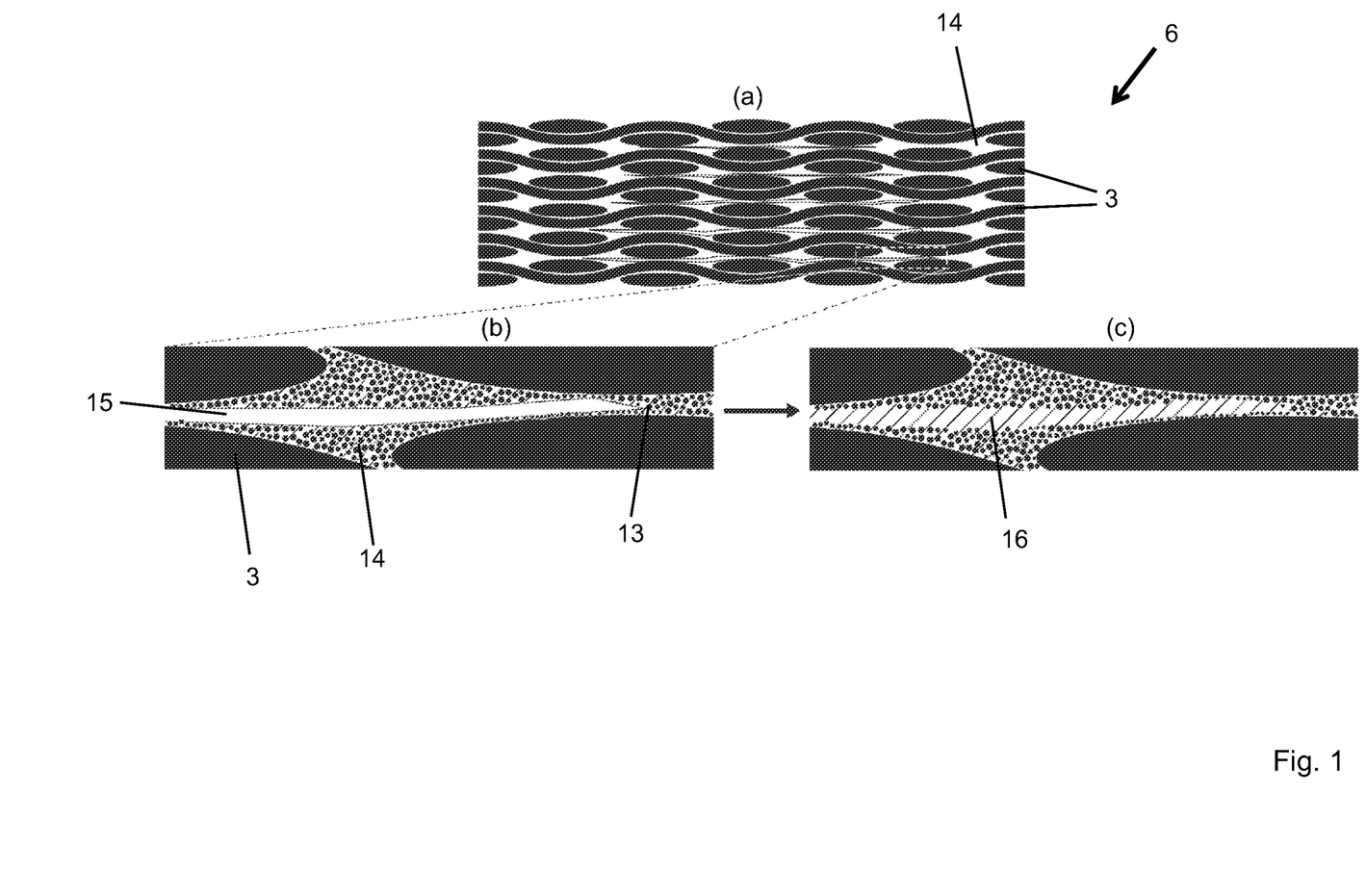
FIG. 1: Schematic visualization of a composite material according to an embodiment of the disclosure and a method for healing a defect in the composite material.

FIG. 1 shows a schematic visualisation of a composite material 6 according to an embodiment of the disclosure and a method for healing a defect in the composite material 6. In particular, picture (a) of FIG. 1 shows a schematic cut-out of the composite material 6. The composite material 6 in part (a) of FIG. 1 comprises several fibre reinforcement bundles 3. These are the black elements shown in part (a) of FIG. 1. The composite material 6 furthermore comprises a polymer matrix 14, shown as the white parts in part (a) of FIG. 1.

Part (b) of FIG. 1 shows a zoom-in on a subsection of the composite material 6 shown in part (a) of FIG. 1. In this zoom-in, certain fibre reinforcement bundles 3 are partly shown. Of these fibre reinforcement bundles 3, only one is equipped with a reference sign for the sake of simplicity. Furthermore, in part (b), the polymer matrix 14 is shown in more detail. In particular, it can now be observed that the polymer matrix 14 comprises a multitude of thermoset particles 13. These thermoset particles 13 are represented as small black dots. Only one of them is equipped with a reference sign for the sake of simplicity. Within the polymer matrix 14, the thermoset particles 13 are surrounded by a continuous thermoplastic phase. The thermoset particles 13 and the thermoplastic matrix together form a matrix microstructure of a particular form in the polymer matrix 14. The zoom-in in part (b) of FIG. 1 furthermore shows a crack 15. The crack 15 shown in part (b) is not necessarily true to scale, because the entire FIG. 1 is a schematic representation.

Part (c) of FIG. 1 shows the same zoom-in as already shown in part (b) of FIG. 1 after a healing of the crack 15 has occurred. Accordingly, the zoom-in in part (c) shows exactly the same content as the zoom-in in part (b), except for the fact that the crack 15 is now a healed crack 16. It is visualised in part (c) of FIG. 1, that the area of the crack has been filled up by parts of the polymer matrix 14, in particular by the continuous thermoplastic phase. It is once more reminded, that the representation in FIG. 1 is schematic and does not have to be seen as a true-to-scale representation.

Figure 2:
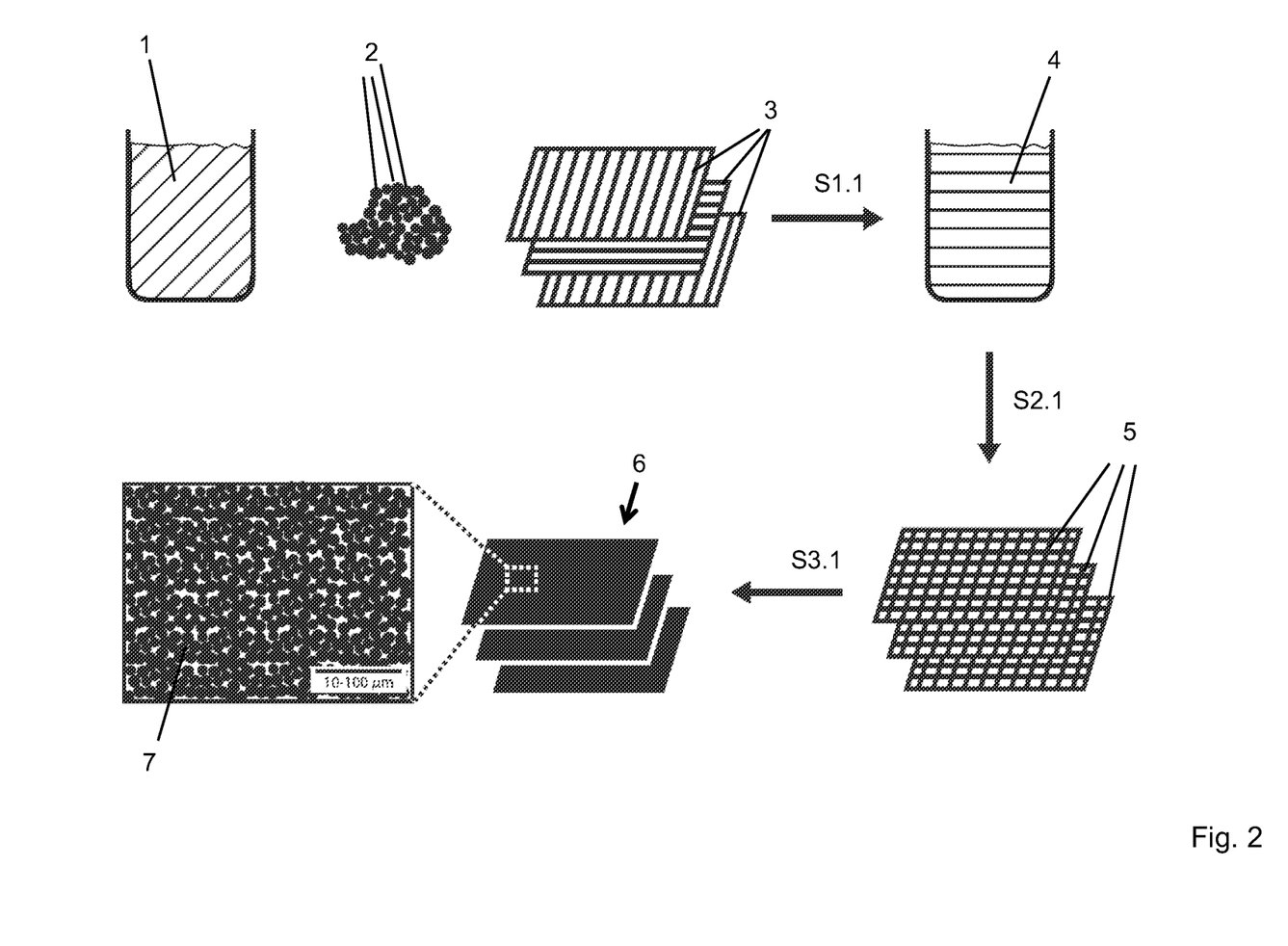
FIG. 2: Schematic view of a first method for producing a composite material according to an embodiment of the disclosure.

FIG. 2 shows a schematic view of a first method for producing a composite material 6 according to an embodiment of the disclosure. In particular, FIG. 2 shows a liquid thermoset 1, a multitude of thermoplastic pellets 2, and fibrous reinforcements 3 in the form of sheets as starting materials. During a first step S1.1, a liquid thermoset-thermoplastic blend 4 is created from the liquid thermoset 1 and the thermoplastic pellets 2. During a second step S2.1, the liquid thermoset-thermoplastic blend 4 is applied onto the fibrous reinforcement 3, such as to create several prepreg layers 5, and thereby attaching these prepreg layers 5 to each other. During a third step, which is a curing step S3.1, the prepreg layers 5 are then exposed to a curing temperature for a certain time, thereby creating the cured composite material 6. The cured composite material 6 is then a solid material. This composite material exhibits the matrix microstructure 7 visualised as a zoom-in in FIG. 2.

In an embodiment of the method visualized in FIG. 2, the liquid thermoset 1 and the thermoplastic pellets 2 are mixed at a temperature above the melting point of the thermoplastic pellets 2. Alternatively, the mixing can be carried out below the melting point of the thermoplastic pellets 2 if a solvent is first used to dissolve the thermoplastic pellets 2 into this solvent before mixing with the liquid thermoset 1. After the mixing, the solvent is typically evaporated.

In at least some embodiments, the liquid thermoset-thermoplastic blend 4 resulting from the mixing of the liquid thermoset 1 and the thermoplastic pellets 2 is further pre-impregnated into the fibrous reinforcement 3 at a temperature suitable for that process. The temperature of the pre-impregnation process is not necessarily above the thermoplastic melting point: this temperature can also be lower than the melting point of the thermoplastic pellets 2 because the components 1, 2 are mixed already. Curing and postcuring, which are typically carried out after preimpregnation, are carried out at temperatures and for durations which are adapted to the type of thermoset used. These temperatures can be below or above the thermoplastic melting point.

Figure 3:
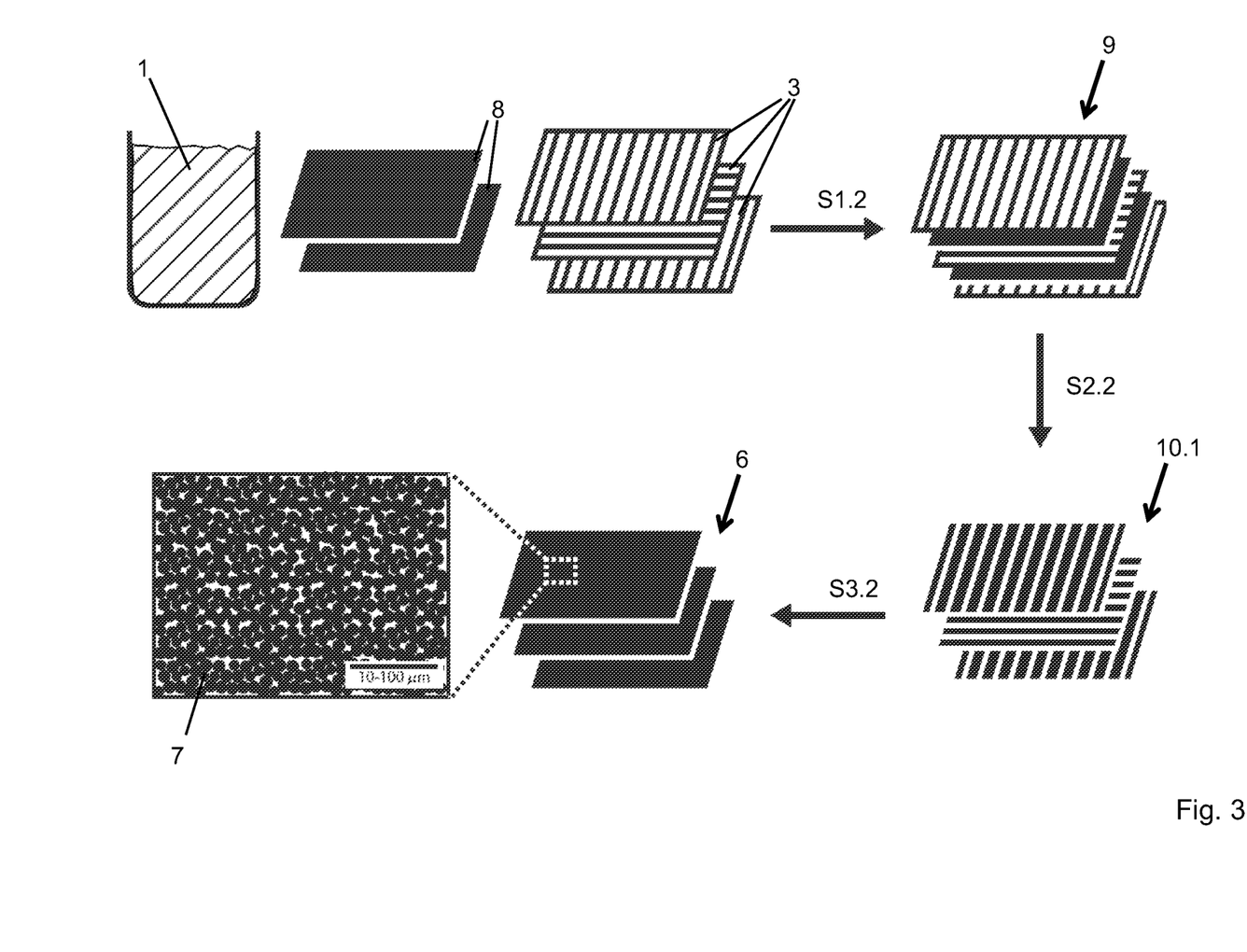
FIG. 3: Schematic view of a second method for producing a composite material according to an embodiment of the disclosure.

FIG. 3 shows an alternative method for producing a composite material 6 according to an embodiment of the disclosure, namely a second embodiment. In particular, in FIG. 3 a liquid thermoset 1, a multitude of thermoplastic thin films 8 and a multitude of fibrous reinforcements 3 in the form of sheets are shown as starting materials. During a first step S1.2, a film-reinforcement-stack 9 is built from the thermoplastic thin films 8 and fibrous reinforcement 3 in the form of sheets. In particular, one thermoplastic thin film 8 is inserted between two sheets of fibrous reinforcement 3 and so on. Like this, the film-reinforcement-stack 9 having the sandwich structure as shown in FIG. 3 is created. The sandwich structure shown in FIG. 3 is of course of schematic nature: in practice, many more fibrous reinforcement sheets 3 are used in a film-reinforcement-stack for example 16 or several hundreds, for example 300. During a second step S2.2, the film-reinforcement-stack 9 is then infused by the liquid thermoset 1, such as to create an infused stack 10.1. This infused stack 10.1 is then exposed to a curing, typically at an adapted curing temperature, such as to create the cured composite material 6. This cured composite material 6 has exactly the same matrix microstructure 7 as the cured composite material 6 already shown in FIG. 2.

Figure 4:
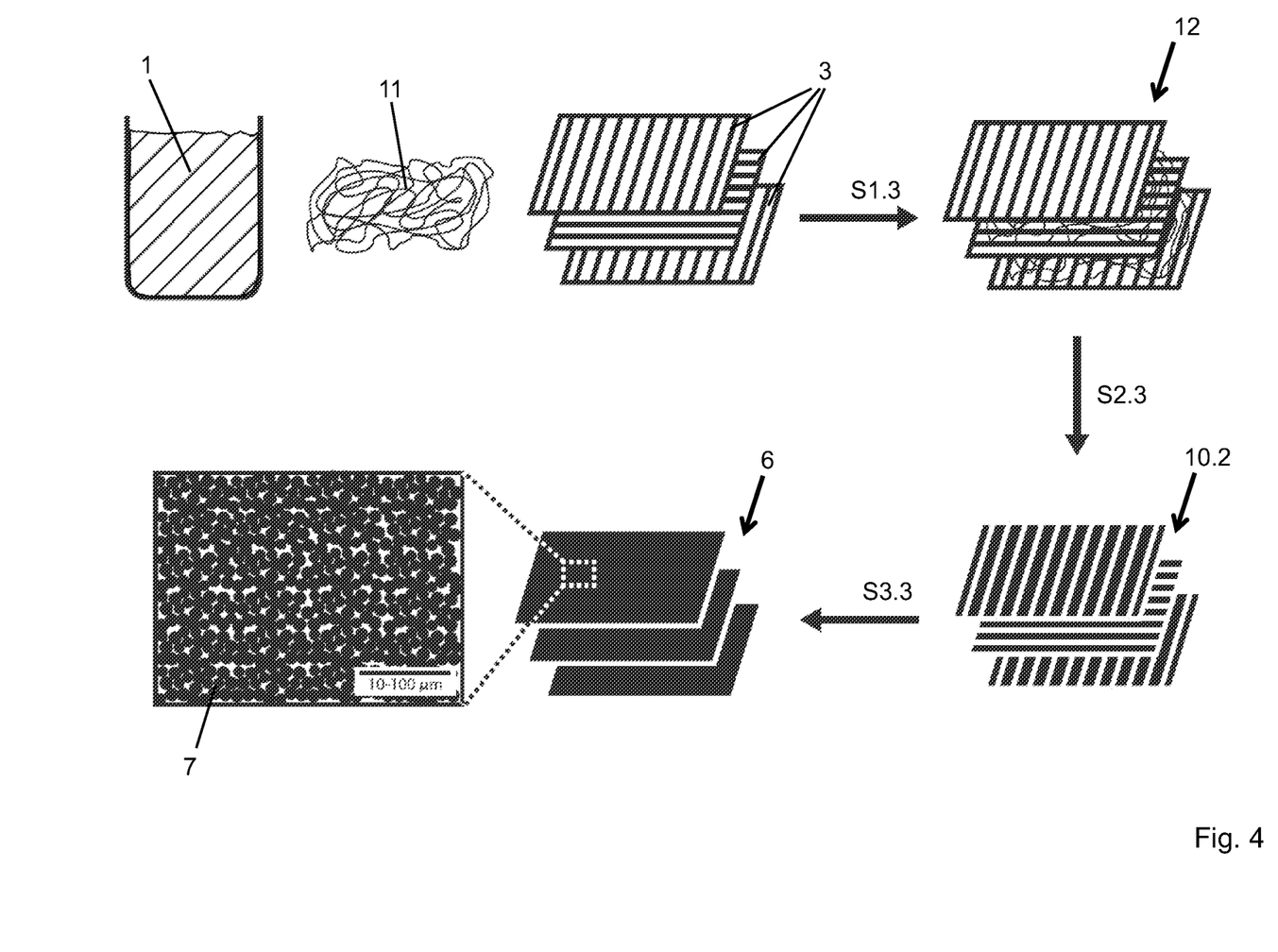
FIG. 4: Schematic view of a third method for producing a composite material according to an embodiment of the disclosure.

FIG. 4 shows a third embodiment of the disclosure, namely a further method for producing a composite material 6 according to an embodiment of the disclosure. In particular, FIG. 4 shows a liquid thermoset 1, several thermoplastic spun fibres 11 and a multitude of sheets as fibrous reinforcement 3 as starting materials. During a first step S1.3, a fibre-reinforcement-stack 12 is created from the thermoplastic spun fibres 11 and the fibrous reinforcements 3. During a second step S2.3, the fibre-reinforcement-stack 12 is infused by the liquid thermoset 1, such as to create the infused stack 10.2. During a curing step S3.3, this infused stack 10.2 is exposed to an adapted temperature for a certain time, thereby creating the cured composite material 6. As already shown in FIGS. 2 and 3, the cured composite material 6 exhibits the matrix microstructure 7. This matrix microstructure 7 then has the healing capacities described previously and is in particular able to heal cracks as visualised in FIG. 1.

In the methods visualized in FIGS. 3 and 4, the infusion, which is carried out during the respective second steps S2.2, S2.3, is typically made at a temperature below the thermoplastic melting point (i.e. the melting point of the thermoplastic thin films 8 or the thermoplastic spun fibres 11, respectively) to avoid moving and/or displacement of the thermoplastic within the respective reinforcement stack 8, 9. Curing and postcuring, which are typically carried out after infusion, are carried out at temperatures and for durations which are adapted to the type of thermoset used. These temperatures can be below or above the thermoplastic melting point.

In one particular example (applicable for example to the method shown in FIG. 3 and to the method shown in FIG. 4), infusion is made at ambient temperature, then curing is carried out at 60° C. for 24 h to obtain phase separation, and finally postcuring at 80° C. for 15 h to provide structural mechanical properties to the resin. This schedule can be modified, for example to: curing at 60° C. for 6 h, postcuring at 80° C. for 4 h and second postcuring at 100° C. for 1 h to provide similar results. These curing and/or postcuring temperatures and times are in principle also applicable to the method visualized in FIG. 2.

Figure 5:
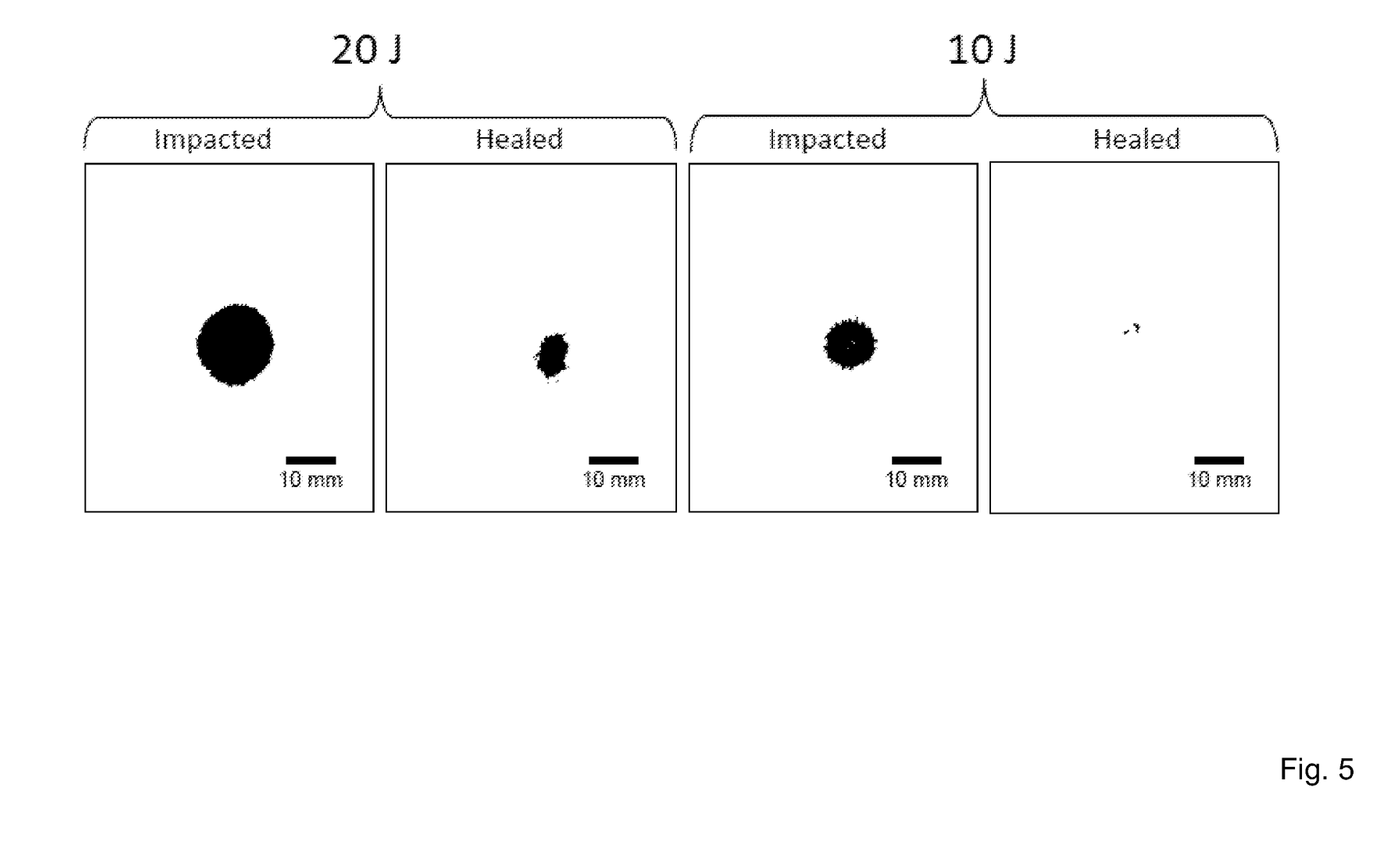
FIG. 5: Visualization of a healed impact in a composite material according to an embodiment of the disclosure.

FIG. 5 shows a visualization of impacts and healed impacts in composite materials according to the disclosure. As already mentioned, after a damage (for example a microcrack) has occurred on the composite material according to an embodiment of the disclosure, this damage can be healed by moderate application of heat. This is visualized in FIG. 5, which shows two impacts in a composite material according to an embodiment of the disclosure, namely one created by a 20 J impact (left side of FIG. 5) and one created by a 10 J impact (right side of FIG. 5). The impact size for 20 J is larger than the impact size for 10 J. For each impact energy (namely 20 J and 10 J), FIG. 5 also shows the respective impacts after moderate heat treatment of the composite material. It can easily be observed that, in both cases, a substantial healing of the impact has occurred.

In an embodiment of the disclosure, the composite material is made by vacuum assisted resin infusion moulding, with glass fibre woven textiles (38% to 55% volume fraction), 40 μm thick interlayers of polycaprolactone (PCL, Capa 6500, from Perstorp), and epoxy resin (RIM 135, from Momentive). This composite material demonstrated toughness increase by 22% (from about 1200 up to 1500 J/m$^2$), as compared to reference specimens with epoxy resin only, while keeping excellent structural capacity (210 MPa of compressive strength as compared to 260 MPa for the reference specimens, i.e. a decrease of 20%). After a heat treatment at 150° C. for 30 minutes, toughness could be recovered by 38% in average. Furthermore, after impact damage at incident energies of 10 and 20 Joules and heat treatment at 150° C. for 30 minutes, the composite material could recover the damage area by 97% and 53%, respectively (much as the example shown in FIG. 5). This recovery also corresponded to a full recovery of compression after impact properties up to 20 Joules incident energy, thus demonstrating the capacity of these systems to heal damage events in structural fibre reinforced polymer composites.

In at least some embodiments, toughness and crack healing rely on the peculiar matrix microstructure, resulting from dissolution of the thermoplastic phase into the thermoset phase, for example an epoxy monomer, and a subsequent polymerization induced phase separation mechanism, all taking place during processing. The resulting matrix microstructure consists of an interpenetrated network of interconnected thermoset particles with a surrounding thermoplastic matrix. Upon heating, the thermoplastic matrix melts, flows and heals microcracks created during a damage event. The matrix microstructure is typically such that the thermoset particles are in the range of 1-10 μm and the thermoplastic phase dimensions are typically in the same range. It is also possible that the matrix microstructure is such that the thermoset particles are in the range of 0.1-10 μm and the thermoplastic phase dimensions are in the same range. The thermoplastic phase viscosity is typically low enough to flow under the pressure created by its own thermal expansion during a moderate heat treatment that does not damage the structural integrity of the material. The volumetric ratio of thermoset to thermoplastic is typically comprised between 70/30 and 90/10. The structural healable composite material (which can for example have a thickness between 1 mm and 20 mm) can for example be produced by three processes: (i) blending the thermoset and the thermoplastic materials in the liquid state before application of the matrix on the fibrous reinforcement to create a prepreg material, that is further processed as any thermoset prepreg (e.g. in an autoclave, out of autoclave, in a press . . . ), (ii) addition of spiked thermoplastic thin films (of thicknesses comprised in the range 20-100 μm) as interlayers in between each fibrous reinforcement layer before infusion of the pure thermoset matrix, followed by (partial or complete) dissolution of the thermoplastic phase and cure, (iii) deposition of thermoplastic spun fibres onto the fibrous reinforcement layers before infusion and cure of the thermoset matrix.

The invention is not limited to the preferred embodiments described here. The scope of protection is defined by the claims.

Furthermore, the following claims are hereby incorporated into the Description of Preferred Embodiments, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

1 Liquid thermoset
2 Thermoplastic pellets
3 Fibrous reinforcement
4 Liquid thermoset-thermoplastic blend
5 Prepreg layers
6 Cured composite material
7 Matrix microstructure
8 Thermoplastic thin film
9 Film-reinforcement-stack
10.1, 10.2 Infused stack
11 Thermoplastic spun fibres
12 Fibre-reinforcement-stack
13 Thermoset particles
14 Polymer matrix
15 Crack
16 Healed crack
S1.1 . . . S1.3 First step
S2.1 . . . S2.3 Second step
S3.1 . . . S3.3 Curing step

The invention claimed is:

1. Healable composite material, comprising:
a fibrous reinforcement, and
a polymer matrix,
wherein the polymer matrix comprises two interpenetrating phases, the interpenetrating phases are a thermoset phase and a continuous thermoplastic phase,
wherein the thermoset phase and the thermoplastic phase form a matrix microstructure,
wherein the matrix microstructure comprises a thermoplastic matrix formed by the thermoplastic phase,
wherein the matrix microstructure comprises a multitude of thermoset particles formed by the thermoset phase,
wherein the fibrous reinforcement is in the form of sheets,
wherein the thermoplastic phase is defined by thin films or is at least partly defined by thermoplastic spun fibers in the fibrous reinforcement so as to form a fiber-reinforcement-stack, the thermoplastic phase being adapted to partially or completely dissolve in the thermoset phase so as to form the matrix microstructure,
wherein a volumetric ratio of thermoset to thermoplastic is between 70/30 and 90/10, and
wherein the thermoset particles have dimensions in a range between 0.1 µm and 10 µm,
so that the polymer matrix flows and heals microcracks in the composite material upon applying a repair temperature between 80° C. and 180° C.

2. Composite material according to claim 1, wherein the fibrous reinforcement has a fibre volume fraction between 20% and 75%.

3. Composite material according to claim 1, wherein the thermoset phase comprises epoxy resin and/or the thermoplastic phase has a melting point below 200° C. and/or the thermoplastic phase has a viscosity low enough to flow under the pressure created by its own thermal expansion during a moderate heat treatment.

4. Composite material according to claim 1, wherein the matrix microstructure comprises an interpenetrated network of interconnected thermoset particles with a surrounding thermoplastic matrix.

5. Composite material according to claim 1, wherein phase dimensions of the thermoplastic phase are in a range between 0.1 µm and 10 µm at least in one direction.

6. Composite material according to claim 1, wherein the composite material has a thickness between 0.5 mm and 30 mm.

7. Composite material according to claim 1, wherein the thermoplastic films are perforated and/or have a thickness between 20 µm and 1000 µm.

8. Composite material according to claim 1, wherein the thin films are arranged as interlayers between layers of the fibrous reinforcement.

9. Composite material according to claim 1, wherein the fibers have diameters between 20 µm and 1000 µm.

10. Composite material according to claim 1, wherein the thermoplastic spun fibers are depositing the onto the fibrous reinforcement or co-weaved with the fibrous reinforcement.

* * * * *